United States Patent

Wolf

[15] 3,666,991

[45] May 30, 1972

[54] RESONANCE SUPPRESSING METHOD AND APPARATUS

[72] Inventor: Herman B. Wolf, Charlotte, N.C.
[73] Assignee: R. H. Bouligny, Inc., Charlotte, N.C.
[22] Filed: Nov. 23, 1970
[21] Appl. No.: 91,939

[52] U.S. Cl. .................................. 317/14, 338/57, 338/324, 317/16
[51] Int. Cl. ........................................ H02h 7/04
[58] Field of Search .................. 338/57, 58, 324; 317/14, 15, 317/16

[56] References Cited

UNITED STATES PATENTS

| 2,081,894 | 5/1937 | Meyer | 338/324 X |
| 2,087,340 | 7/1937 | Davis | 317/14 B |

Primary Examiner—D. X. Sliney
Attorney—Parrott, Bell, Seltzer, Park & Gibson

[57] ABSTRACT

Resonance effects otherwise possibly occuring upon a change in energization of an unloaded power transformer having leads connected in a main alternating current electrical circuit are suppressed through the temporary connection of a resonance suppressing impedance between a lead of the transformer and an electrical ground, with such electrical connection being maintained only through a change in the state of energization of the unloaded transformer.

5 Claims, 3 Drawing Figures

Patented May 30, 1972
3,666,991
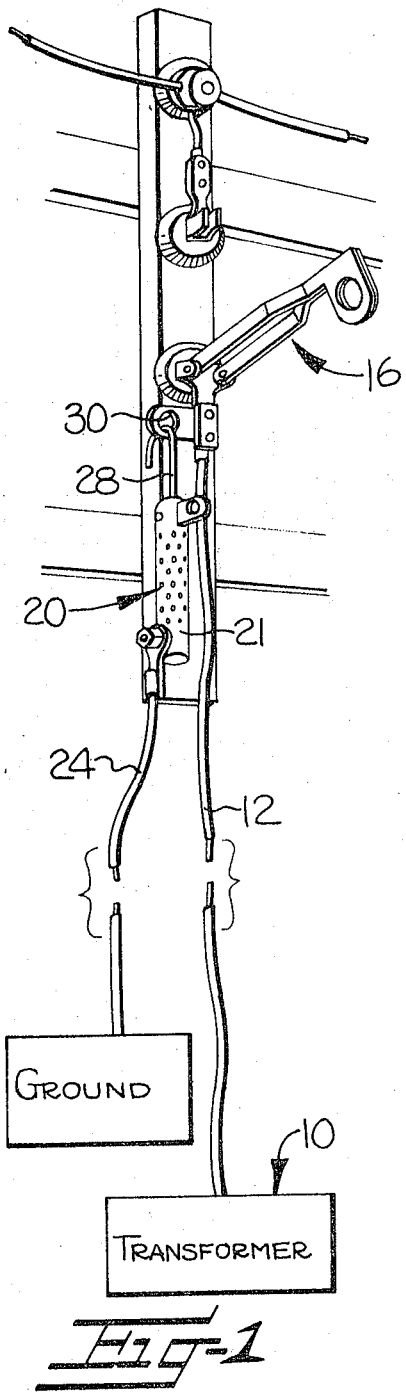
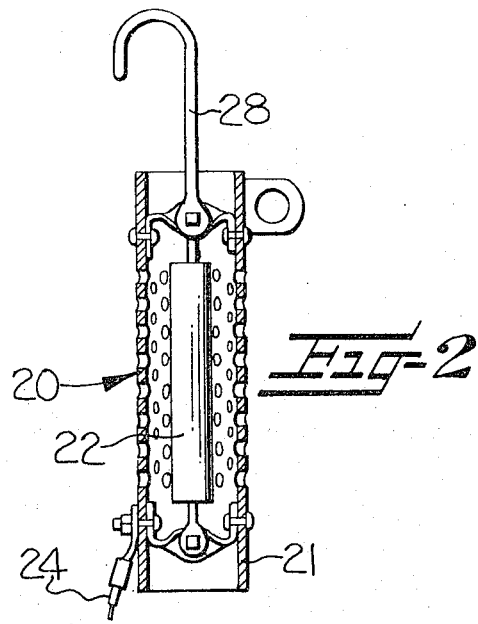
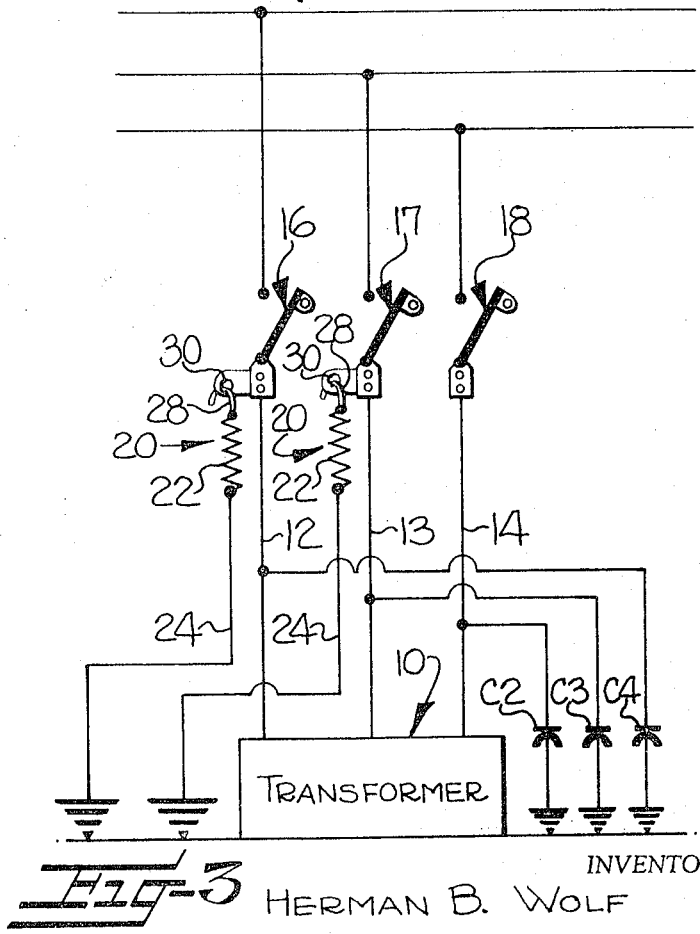
INVENTOR:
HERMAN B. WOLF
BY Parrott, Bell, Seltzer, Park & Gibson
ATTORNEYS

RESONANCE SUPPRESSING METHOD AND APPARATUS

Electrical power is commonly supplied to customers through transformer banks which reduce a relatively higher transmission voltage to a relatively lower voltage appropriate for the customer's power needs. Particularly in connection with residential power supply systems, such transformer banks are now commonly connected with underground cable. Such use of underground cable has particularly emphasized and pointed out a difficulty which arises due to the normal capacitance present between a power conducting cable and electrical ground. In particular, it is usually desirable to energize a transformer before a secondary load is applied thereto. Where the energization of a transformer is changed by closing and opening single phase cutouts or disconnects at the source end of connecting cables, the transformer winding inductance and cable to ground capacitance may lead to occurrence of ferroresonance effects. Such resonance effects may result in damage to protective equipment, damage to the transformer, or damage to the cable. Further, such resonance effects involve variances from normal operating frequencies which may produce sounds and other sensed effects which are disconcerting to operating personnel.

Heretofore, such ferroresonance effects have been minimized or avoided by the purchase of special transformers or by the temporary connection of an artificial load to the secondary side of a transformer prior to a change in the energization thereof. Such approaches have suffered from deficiencies and difficulties, in that the equipment required is relatively more expensive than conventional power equipment and the artificial loads imposed require handling of a relatively large resistance installation in order to be effective for suppressing ferroresonance through loading of the transformer.

In view of the above, it is an object of the present invention to suppress ferroresonance effects of the type described while facilitating the adoption and use of the present invention. This object is realized through a method which is readily practiced by linemen and other field personnel, so as to thereby be readily incorporated into standard operating procedures for energizing or de-energizing power transformers. Further, the present invention particularly contemplates use of readily portable means which may easily be carried in an equipment truck for usage as may be required.

A further object of the present invention is the provision of a portable resonance suppressing apparatus which may readily and quickly be applied by a lineman or other field personnel to suppress resonance effects of the type described above, thereby reducing the capital investment required to avoid the deleterious effects of occurrence of such ferroresonance. In accomplishing this object of the present invention, a resonance suppressing impedance means is arranged for ready temporary electrical connection with elements of a main alternating current electrical circuit, in parallel with the capacitance of a transformer lead to ground. By such connection of the impedance means, any resonance effect appearing on the lead upon a change in energization thereof is damped while the size and cost of the apparatus which thereby controls resonance effects are kept within bounds.

Some of the objects and advantages of the invention having been stated, others will appear as the description proceeds, when taken in connection with the accompanying drawings, in which FIG. 1 is a perspective view, partially schematic, of a portion of a power supply system illustrating use of the present invention;

FIG. 2 is an enlarged elevation view, in section, of the resonance suppressing apparatus of the present invention; and FIG. 3 is a schematic diagram of a power supply system showing the interconnection of the resonance suppressing apparatus of the present invention therewith.

For purposes of illustration in the accompanying drawing, the present invention is shown in connection with changes in energization of a three-phase power transformer generally indicated at 10 (FIG. 3) which is electrically connected in a main alternating current electrical circuit through the use of three primary leads 12, 13, 14. Each primary lead connects to a corresponding one of three single-phase disconnect switches or cutouts, 16, 17, 18. As is conventional, the single-phase disconnect switches incorporate elements electrically connected to the leads 12, 13, 14 and elements electrically connected to the conductors of the main alternating current electrical circuit, with movable sections provided for connecting and disconnecting these elements and thereby changing the energization of the leads 12, 13, 14 and the power transformer 10 supplied through the leads.

As briefly described above, the leads 12, 13 and 14 and the power transformer 10 are subject to the appearance therein of ferroresonance effects, particularly where the leads 12, 13, 14 pass underground and the secondary windings of the power transformer 10 are unloaded or at most very lightly loaded. Such resonance effects appear primarily in view of the capacitance of the leads 12, 13, 14 to electrical ground, set up due to the insulation surrounding the conductors of the leads and indicated schematically in FIG. 3 by the capacitors C2, C3, C4.

In accordance with the present invention, the lead to ground capacitance of at least two to the underground leads is shunted by the temporary electrical connection therewith of resonance suppressing impedance means. In order to facilitate ready application of the present invention, such means preferably is incorporated in a portable resonance suppressing apparatus generally indicated at 20. In accordance with the present invention, the apparatus 20 comprises a hollow elongate, open ended tube 21 of electrically insulating material. Mounted within the tube 21 for cooling air flow therearound is a resonance suppressing impedance means 22, preferably in the form of an electrical resistor.

The impedance means 22 is electrically connected in parallel with a lead to ground capacitance through the provision of grounding conductor means 24 electrically connected to the impedance means 22 and adapted to be electrically connected to an electrical ground. Preferably, the grounding conductor means 24 comprises a length of flexible electrical conductor secured to one end of the tube 21 and a conductive clamp means mounted at the other end of the flexible conductor for facilitating ease in connection thereof with an electrical ground such as a grounding rod driven into the ground adjacent the location of use of the portable resonance suppressing apparatus 20. The impedance means 22 is electrically connected with a selected lead through the provision of electrically conductive suspension means 28 mounted adjacent the other end of the tube 21. As illustrated, the suspension means preferably comprises a hook member for facilitating ease in hanging and removal of the apparatus 20, as by suspending the tube 21 from an opening 30 provided in or adjacent that portion of a disconnect switch which is electrically connected with the selected one of the leads 12, 13, 14. As will be noted, the suspension means is adapted to hang the tube 21 from the main alternating electrical circuit so as to electrically connect the impedance means 22 in parallel with the capacitance C2, C3, C4 of the selected one of the leads 12, 13, 14. The resulting parallel resistance-capacitance circuit so varies the characteristics as to damp any resonance effect otherwise possibly appearing in the lead upon a change in energization thereof.

In application of the resonance suppressing apparatus 20 described heretofore, with particular reference to a multiple phase power transformer, resonance suppressing impedances are temporarily electrically connected between each of at least two of the leads and an electrical ground, thereby connecting the resonance suppressing impedances in parallel with the capacitance of the at least two leads to ground. Energization of the transformer is then changed by first changing the energization of the third lead which does not have a resonance suppressing impedance temporarily electrically connected thereto. Then, the energization of the at least two leads having impedances temporarily connected thereto are changed to complete the change in energization of the power transformer.

The resonance suppressing apparatus are then disconnected from the leads and may be stored in an equipment truck or automobile pending the next subsequent need therefor.

It is to be noted that the method of the present invention is equally applicable to the energizing of the leads to effect energization of the power transformer and to the de-energizing of the leads to effect de-energization of the power transformer. Further, in instances where a single-phase distribution network is employed, the present invention is applied by connecting a resonance suppressing impedance to one of the leads and first changing the energization of the other lead. Thus, the present invention will be understood as being applicable to the various power distribution approaches presently in use in connection with alternating current electrical power.

In the drawings and specification, there has been set forth a preferred embodiment of the invention, and although specific terms are employed, they are used in a generic and descriptive sense only and not for purposes of limitation.

What is claimed is:

1. A method of suppressing resonance effects otherwise possibly occurring upon a change in energization of an unloaded power transformer having leads connected in a main alternating current electrical circuit, the method comprising the steps of temporarily electrically connecting a resonance suppressing impedance between a lead of the unloaded transformer and an electrical ground, then changing the state of energization of the unloaded transformer while damping with the resonance suppressing impedance any resonance effect appearing in the lead, and then removing the resonance suppressing impedance from connection with the lead and ground.

2. A method according to claim 1 wherein the temporary connection of the resonance suppressing impedance comprises electrically connecting one terminal of a resistor to the electrical ground and then electrically connecting another terminal of the resistor to the lead so that the resistor is effectively placed in parallel with the capacitance of the lead to the ground.

3. A method of suppressing resonance effects otherwise possibly occurring upon a change in energization of an unloaded, multiple phase, power transformer having at least three underground leads connected in a main alternating current electrical circuit, the method comprising the steps of temporarily electrically connecting resonance suppressing impedances between each of at least two of the underground leads and an electrical ground and thereby connecting the resonance suppressing impedances in parallel with the capacitance of the at least two leads to the ground, then changing the energization of another underground lead not having a resonance suppressing impedance temporarily electrically connected thereto, then changing the energization of the at least two leads having resonance suppressing impedance temporarily electrically connected thereto to complete the change in energization of the power transformer, and then disconnecting the resonance suppressing impedances from the at least two leads.

4. A method according to claim 3 wherein the steps of changing energization of leads include de-energizing the leads to effect de-energization of the power transformer.

5. A method according to claim 3 wherein the steps of changing energization of leads include energizing the leads to effect energization of the power transformer.

* * * * *